United States Patent [19]

Fallon

[11] Patent Number: 4,612,952

[45] Date of Patent: Sep. 23, 1986

[54] VALVE ASSEMBLY AND COUPLER THEREFOR

[75] Inventor: Merton R. Fallon, Thousand Oaks, Calif.

[73] Assignee: Draft Systems, Inc., Northridge, Calif.

[21] Appl. No.: 705,439

[22] Filed: Feb. 25, 1985

[51] Int. Cl.$^4$ ............................................. B67D 5/54
[52] U.S. Cl. ................................ 137/212; 222/400.7; 285/314
[58] Field of Search ...................... 137/212; 222/400.7, 222/400.8, 401; 285/81, 82, 84, 91, 314, 315

[56] References Cited

U.S. PATENT DOCUMENTS

| | | | |
|---|---|---|---|
| 1,371,882 | 3/1921 | Ferguson et al. | 285/314 |
| 1,879,364 | 9/1932 | Lomar | 285/314 |
| 3,083,042 | 3/1963 | Collar | 285/314 |
| 3,191,972 | 6/1965 | Collar | 285/314 |
| 4,291,821 | 9/1981 | Nezworski | 222/400.7 |
| 4,305,421 | 12/1981 | Fallon | 137/212 |

Primary Examiner—James C. Yeung
Assistant Examiner—Noah Kamen
Attorney, Agent, or Firm—James E. Brunton

[57] ABSTRACT

An improved coupler or tapping mechanism and valve system for obtaining access to a container of fluid. In a container of fluid, and particularly a keg for beer, a valve assembly receiving member or keg neck extends from the top of the container. The keg neck receives a dual valve system which is operated by the coupler. The improved coupler is placed over the keg neck and is positively secured thereto by a three point locking mechanism which engages the external surfaces of the keg neck. A safety locking mechanism is provided which prevents removal of the coupler from the keg neck as long as the dual valves are in an open fluid tapping position.

7 Claims, 13 Drawing Figures

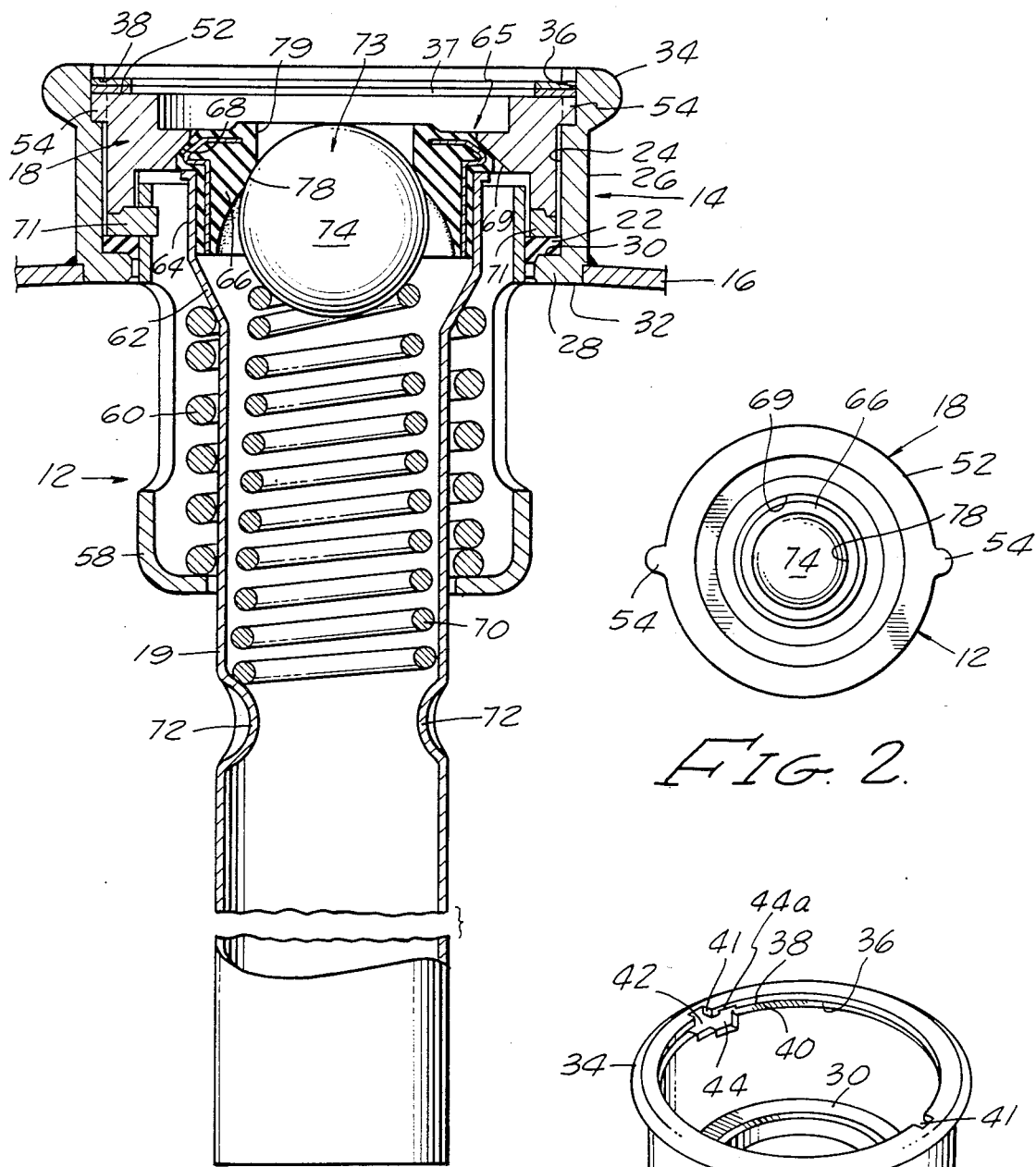
FIG. 1.
FIG. 2.
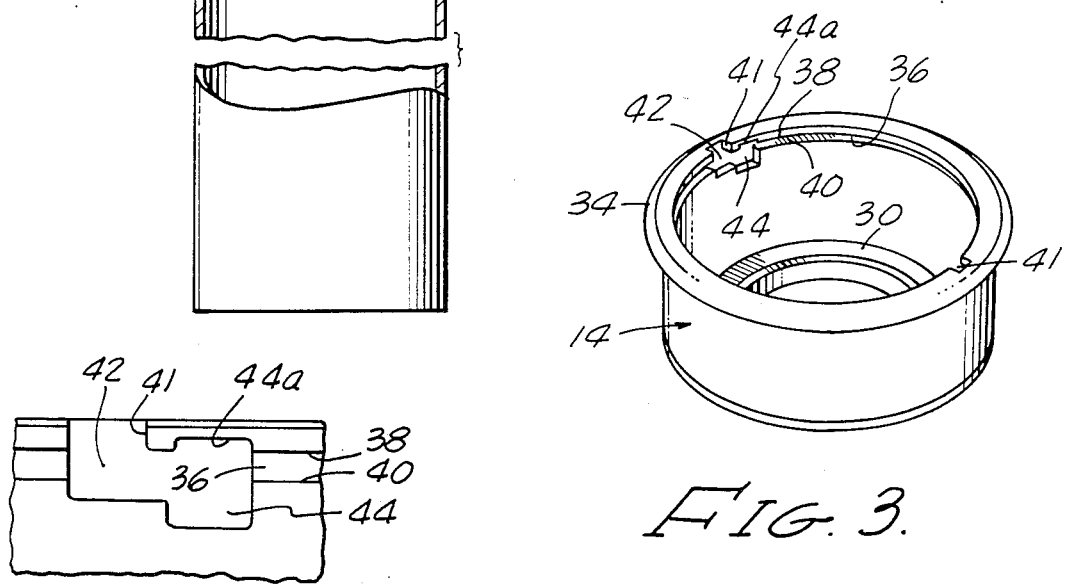
FIG. 3.
FIG. 3a.

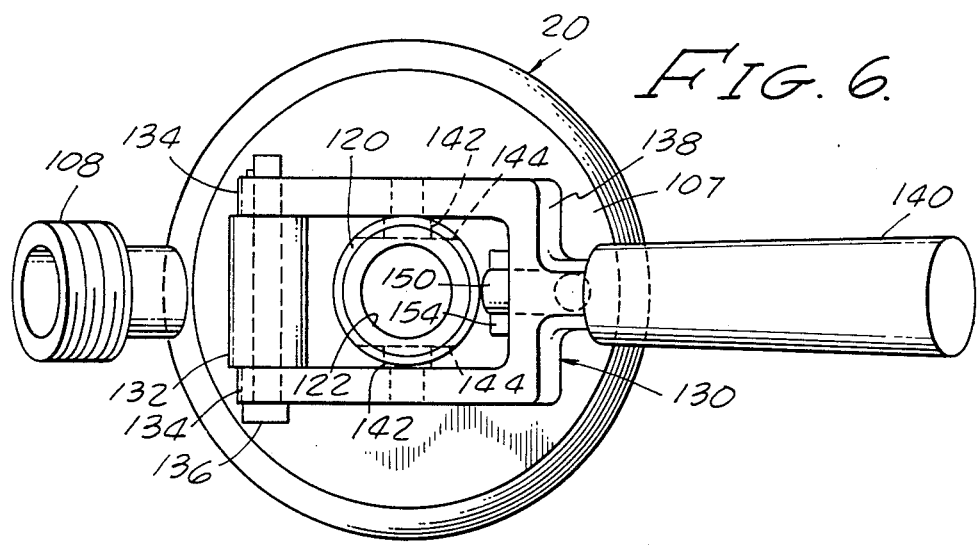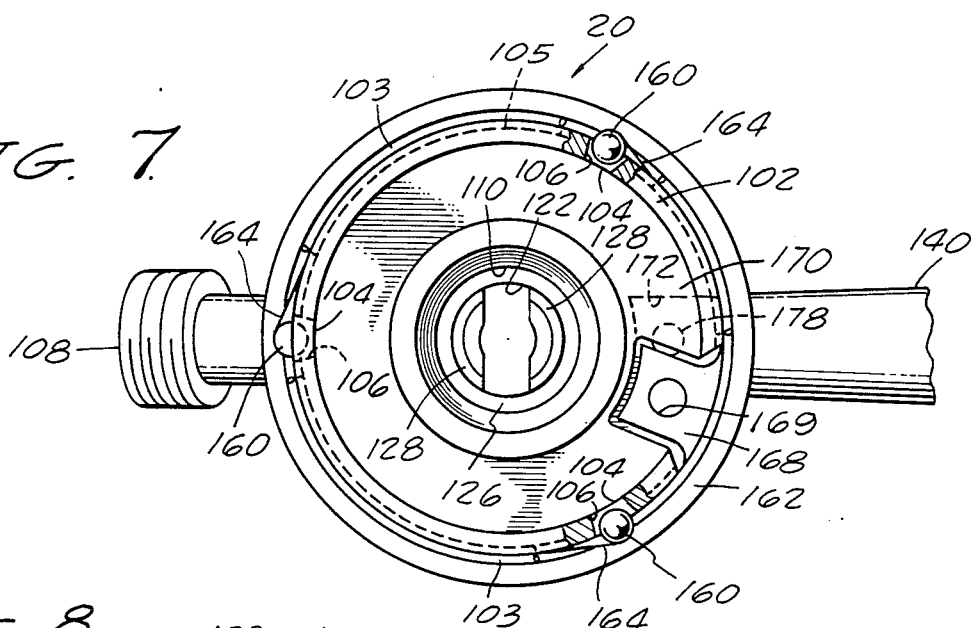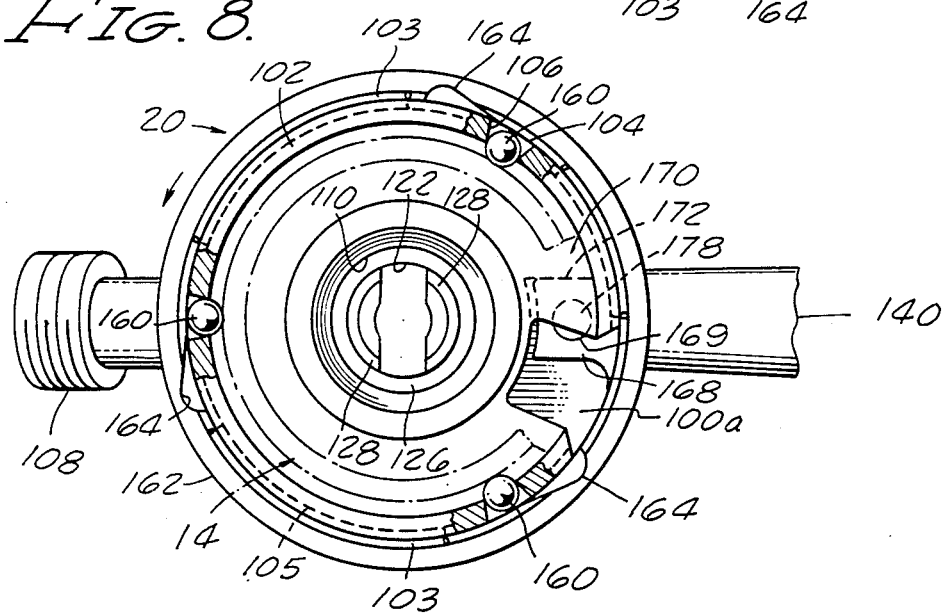

VALVE ASSEMBLY AND COUPLER THEREFOR

BACKGROUND OF THE INVENTION

1. Field of the Invention

The present invention relates generally to valving devices for use in beverage dispensing systems, particularly those systems for drawing liquids, such as beer, from containers, such as beer kegs or barrels, using a gas to drive the liquid from the container. More particularly the present invention relates to an improved coupler for positive interconnection with the fluid container valve system for tapping the valve system to draw liquid from the container.

2. Discussion of the Prior Art

In systems for tapping keys of fluid and particularly containers of beer there has been used a valve assembly secured to the top of the keg for providing access to the fluid ultimately to be delivered from the keg to a remote position for distribution. Typically, the valve assembly includes a dual valve arrangement with a siphon tube which extends from the valve assembly to the bottom of the keg. The valve assembly is fixed within the keg neck or other valve receiving member to provide a valved access to the fluid once it is pressurized. The valve system, when tapped by a coupler or some other keg tapping means connected to a pressure source, allows pressurized gas to flow into the keg until the desired pressure within the keg is achieved to force the fluid out of the keg through the valve system and ultimately to a distribution device where the fluid can be used to fill glasses and the like. The valve system is one which allows the pressurized gas, usually carbon dioxide, to be forced out of the keg to distribution device until the keg is entirely emptied of fluid.

With regard to the coupler or other tapping mechanism, such mechanisms are typically inserted by rotation into the valve assembly. Then by separate action, the handle is actuated to open the valves and permit the flow of fluid into and out of the keg in the appropriate channel. After the fluid has been completely dispensed from the keg, the reverse sequence is followed to reseal the valves. If the aforementioned sequence is followed, there will be no loss of fluid or gas in the tapping or untapping procedure.

However, if the handle is inadvertently placed in the tapped or valve open position prior to attaching the coupler to the valve assembly, the valves will be moved to an open position before the coupler is fully in place allowing some leakage to occur until the coupler is rotated sufficiently to seal the interface between the coupler and valve assembly. Similarly, if the handle is not relocated to close the valves prior to untapping, leakage will occur until the coupler is rotated out of the valve assembly to a position where the valves reach their naturally closed position. Particularly where the keg contains toxic or otherwise dangerous fluid, the leakage occurring from failure to follow the correct tapping and untapping procedure constitutes a physical danger to the operator. For example, where the keg contains concentrated agricultural chemicals, such as pesticides, insecticides, fertilizer, etc., leakage of these chemicals through an improper coupling technique can be seriously deleterious to the health of the operator.

One of the most effective systems ever devised to overcome the drawbacks of the prior art is described in U.S. Pat. Nos. 4,159,102 and 4,181,143. Broadly stated, the systems described in these patents provided better sealability between movable parts to prevent unnecessary leakage, safe operability to protect the operator even from his own errors, and constructional features facilitating cleaning operations and economic savings in manufacturing and assembly, among others. These systems use a coupler device which has a coupler body provided with a wedge surface which is helical in configuration circumscribing the bottom of the coupler body. The wedge surface is adapted to engage inwardly protruding lugs formed on the valve assembly. With this construction, upon rotation of the coupler into the valve system, the interaction of the wedge surfaces with the lugs forces the coupler body downwardly within the valve assembly and into a sealing relationship therewith.

The thrust of the present invention is directed toward providing an improved coupler assembly which has certain cost and operational advantages over the coupler arrangement described in the aforementioned patents. For example, as will be apparent from the description which follows, the coupler assembly of the present invention is placed over, rather than into, the valve system and is positively secured to the outside surfaces of the keg neck or valve assembly receiving member. This permits the coupler to be more compact, avoids the necessity of forming the complex wedge surfaces on the coupler body, and enables the improved seal with the valve system to be accomplished. The problems inherent in forming the wedge surface engaging ears on the valve system and the propensity of these ears to possibly bend or break in operation is also uniquely avoided. Additionally, the coupler of the present invention is also provided with a highly novel and very effective safety locking mechanism which precludes removal of the coupler from the valve system so long as the valves are in an open position.

Another aspect of the present invention concerns the provision of an improved valve system wherein the siphon tube extends proximate the bottom of the beverage container and one of the springs which operates one of the valves is housed interiorly of the siphon tube with one end thereof in pressural engagement with the bottom of the container.

SUMMARY OF THE INVENTION

It is an object of the invention to provide an improved coupler assembly for use in tapping dual valve systems of the type commonly used in beverage dispensing systems. More particularly, an object of the invention is to provide a coupler assembly which is easy to use and embodies a positive three point locking mechanism for sealably securing the coupler to the external surfaces of the valve assembly receiving member which is affixed to the beverage container.

Another object of the invention is to provide an improved coupler assembly of the aforementioned character which is compact, durable in use, inexpensive to manufacture and one which need not be rotationally oriented with respect to the container valve system prior to its interconnection therewith.

A further object of the invention is to facilitate ease of assembly and disassembly of the coupler to the valve system.

Another object of the invention is to arrive at an economical device whose parts are simple to manufacture but still achieve the tolerances necessary for sealing and avoid the complexity which has characterized such devices in the past to enhance the repeatability and extend the life of the device.

A further object is to provide an improved coupler or tapping mechanism of the character described to operate the valves in the valve assembly substantially without leakage, particularly during attachment and detachment of the coupler with the valve mechanism.

It is also an object to incorporate a locking mechanism within the coupler assembly to prevent the coupler from being engaged and disengaged while the mechanism for actuating the valves is in an extended or operative mode.

Still another object is to provide an improved valve system wherein the spring member, which biases one of the valve members of the valve system is located inside the siphon tube and engages the bottom of the beverage container at one end and a series of indentations in the siphon tube at the other end.

These and other objects of the invention will become clear from the description of the invention which follows.

BRIEF DESCRIPTION OF THE DRAWINGS

FIG. 1 is a cross-section of the valve assembly as secured within a valve assembly receiving member, or neck, extending from the top portion of a container such as a beer keg or the like.

FIG. 2 is a top view of the valve assembly removed from the valve neck.

FIG. 3 is a perspective view of the neck shown in FIG. 1.

FIG. 3a is an enlarged fragmentary side-elevational view of one of the recessed areas formed in the neck.

FIG. 6 is a top view of the coupler shown in FIG. 5.

FIG. 7 is a bottom view, partly in section, of the coupler assembly as viewed along lines 7—7 of FIG. 5.

FIG. 8 is a bottom view, partly in section, of the coupler assembly similar to that shown in FIG. 7 but with the outer locking ring rotated to a neck engaging position.

In FIG. 12 the safety locking mechanism is shown in a locking configuration restricting rotation of the coupler assembly.

DESCRIPTION OF THE INVENTION

Figure 4:
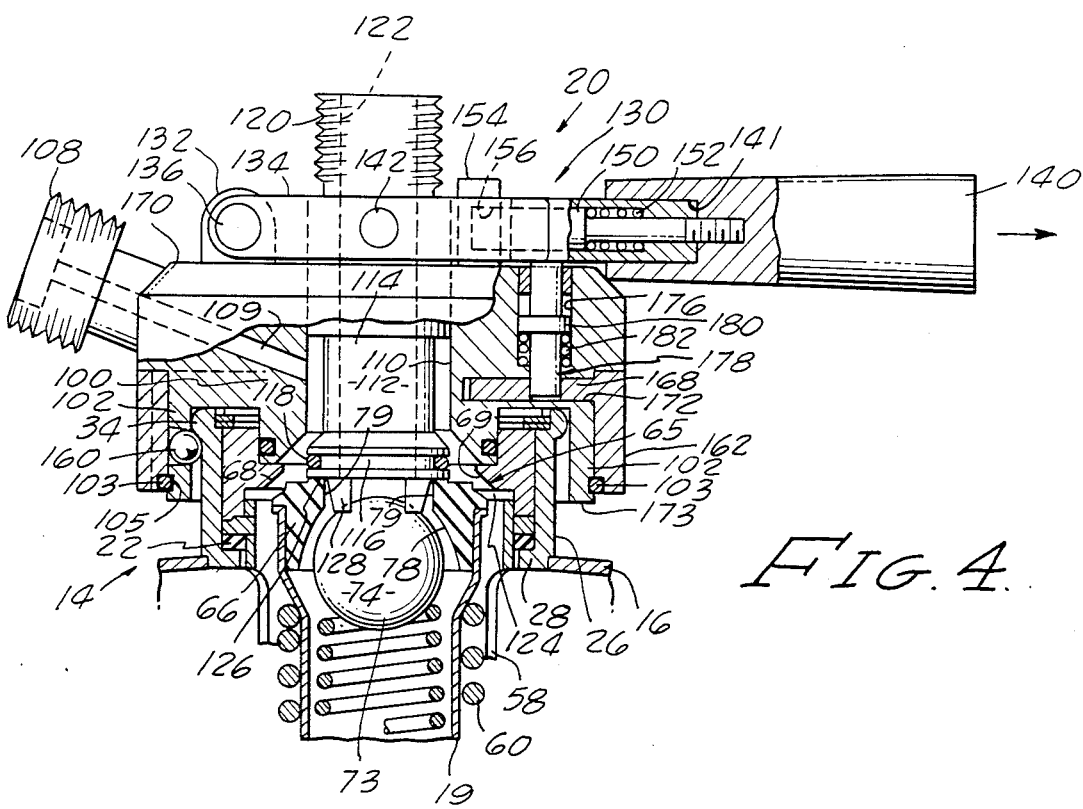
FIG. 4 is a side view, partly in cross-section, of a coupler assembly secured to the valve assembly shown in FIG. 1 with the coupler assembly in an operative configuration opening the valves of the valve assembly.

Referring to the drawings and particularly to FIGS. 1 through 3, there is shown the valve sealing arrangement of the invention for sealing a container of fluid comprising a valve assembly 12 for providing access to the container and a valve assembly receiving member, or neck, 14 secured to a container 16 as by welding. Valve assembly 12 includes a valve body 18 having a siphon tube 19 extending from the bottom of the valve body to a position adjacent to the bottom of the container.

Figure 5:
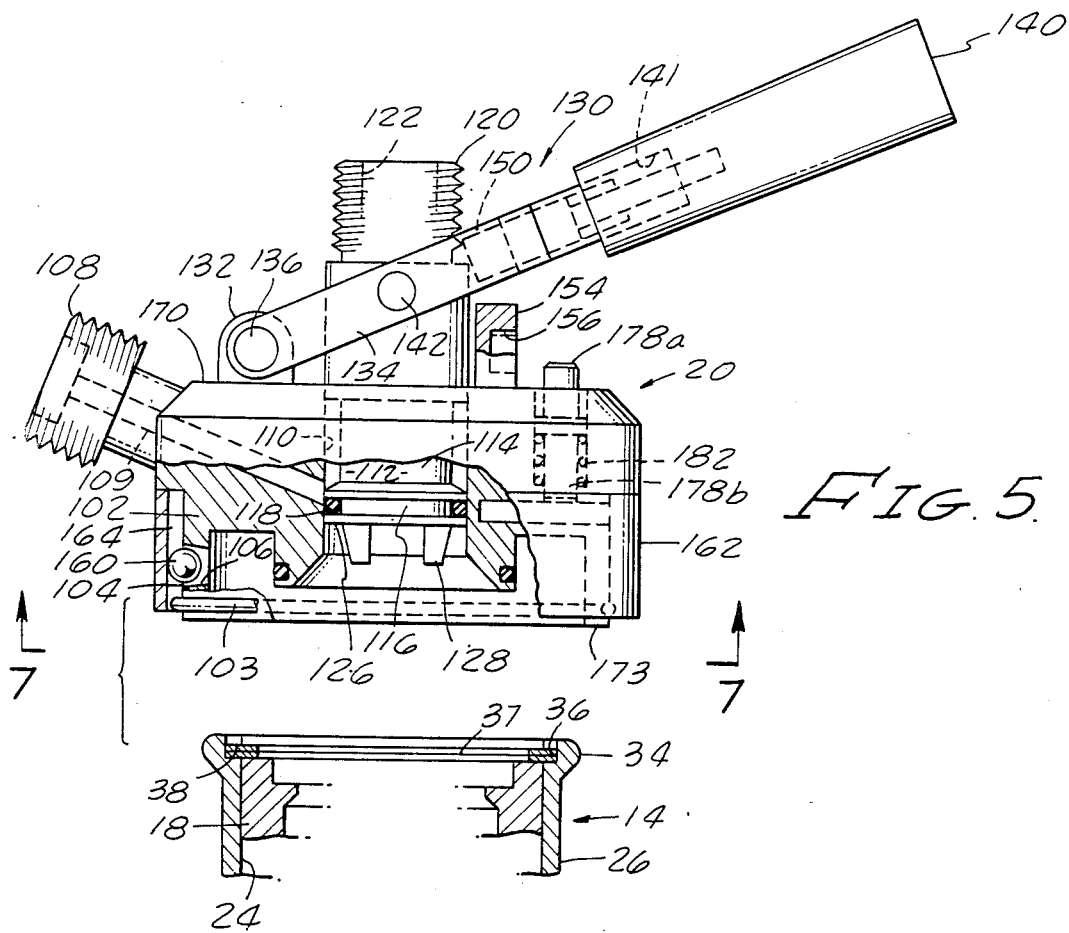
FIG. 5 is an exploded side view, partly in section, of the coupler and valve assembly illustrated in FIG. 4 showing the coupler assembly in a retracted configuration.

The coupler assembly of the invention, which is shown in FIGS. 4 and 5 and identified therein by the numeral 20, is secured to the valve assembly 12 in a manner which allows pressure to be imparted through the coupler assembly 20 to the interior portions of the container for pressurizing the liquid therein and also provides an outlet for the liquid to a conduit downstream of the coupler assembly.

As best seen in FIG. 1, an elastomeric O-ring 22 is secured between member 14 and the valve assembly 12 so that neither fluid under pressure nor the gas providing the pressure can leak between the joints of the valve assembly and the member 14. The valve assembly receiving member, or neck, 14 is generally cylindrical having an inner surface 24 and an outer surface 26. An annular ring 28 extends radially inwardly from the inner surface of the bottom portion of the member 14. This annular ring 28 has an upper surface 30 for engaging a portion of the deformable O-ring 22 and a lower surface 32 which is welded adjacent to the top of the container. The top portion of member 14 defines circumferentially rounded rim portion 34 which has an inner groove 36 therein (FIG. 3) extending entirely around the circumference of the inner surfaces 24 for receiving resilient retainer ring 37. This groove 36 has an upper lip 38 and a lower lip 40 (FIG. 3). Upper lip 38 engages the upper portions of the resilient retainer ring 37 while lower lip 40 engages the lower surface of the retainer ring 37. With this construction the valve body 18 is held securely in position within valve assembly receiving member, or neck, 14 and compresses O-ring 22 to achieve a leak tight seal between the valve body and the neck.

Formed within the side walls of neck 14 is a pair of diametrically opposed keyways 41 each having a first recessed area 42 which communicates with the top portion of the neck 14 through the upper lip 38 of the groove 36. The lower boundary of the first recessed area 42 is disposed slightly below the lower lip 40 of groove 36 (FIG. 3). A second recessed area 44 communicates with the lower lip of the groove 36 and extends downwardly therefrom and is offset circumferentially from the first recessed area 42. An upper inset portion 44a of area 44 is disposed slightly above the upper lip 38 of groove 36. In this way movement through the keyway 41 defines a path that is vertically downward and then laterally through the groove 36 until the second recessed area 44 is reached and then downwardly again.

A pair of diametrically opposed keys 54 extend from the upper portion of the valve body 18 for engagement with the keyway 41 in the neck 12 (FIGS. 1 and 2). The keys 54 extend sufficiently into the recessed areas 42 and 44 to allow for movement within the recessed areas 42 and 44 but are restrained from movement beyond the boundaries defining the keyways 41. With this configuration the keys 54 can be moved vertically to the lower lip 40 in the first recessed area 42, laterally along the grooves 36 connecting the recessed areas 42 and 44 and downwardly into the second recessed area 44. In this way, to place the valve body 18 into the neck 12 so that the retaining ring 37 can be placed within the groove 36, the valve body 18 must initially be rotated to a position where the keys 54 register with the first recessed areas 42. In this position, the valve body can be lowered downwardly until the keys 54 abut the lower lip 40 of the groove 36. The valve body 18 is then rotated until the keys 54 are registered with the second recessed area 44 at which point the valve body 18 can be lowered further until the retainer ring engaging surface 52 of the valve body (FIGS. 1 and 2) is sufficiently below the groove 36 to allow insertion of the retainer ring 37 for holding the valve body 18 in position.

With this configuration, the only way the valve body 18 can be removed is by first removing the retainer ring 37 which is difficult without the proper tools, and then rotating the valve body 18 to the correct position within the keyway 41 allowing it to be removed. This provides a safety mechanism to prevent expulsion of the valve assembly 14 upon inadvertant removal of the retaining ring 37.

Now referring to FIG. 1, the details of the valve assembly 12 are shown. The valve assembly comprises dual valves having a first valve 65 and a second valve 73 operating concentrically with each other about the axis of the siphon tube. Included with the first valve 65 is a spring retainer cup 58 for holding a helical compression external spring 60. The siphon tube 19 has a flared portion 62 near its top portion 64 which engages the top of the helical external spring 60. The bottom portion of the spring 60 rests on the bottom of the cup 58 as shown. The spring 60 is maintained between the bottom of the cup 58 and the flared portion 62 of the siphon tube 19 normally in a compressed position to bias the tube upwardly to maintain the first valve 65 in a normally closed position sealing annular first valve opening 69. A first valve member 66 is carried by the top portion 64 of the top of the siphon tube and engages a first valve seat 68. The helical spring 60 in its normal position maintains the engagement between the first valve member 66 and the valve seat 68 until the spring is compressed even further downwardly to allow displacement of the first valve member 66 away from the first valve seat 68 thereby opening the first valve 65. Retainer cup 58 is apertured about its periphery to receive locking ears 71 (FIG. 1) which ears function to interconnect valve body 18 and retainer cup 58.

The second valve 73 includes a second valve member 74 biased against a second valve seat 78 by an internal spring 70 to seal a second valve opening 79. Displaced from the top portion 64 of the siphon tube are three circumferentially equidistant bulges 72 on the interior portion of the tube formed by impressing dimples on the exterior of the siphon tube. These bulges 72 provide a surface against which the bottom portion of the internal helical spring 70 rests. The top portion of the internal spring 70 engages the second valve member or ball 74 and presses it against the second valve seat 78 defined on the first valve member 66 as shown to maintain the second valve in a normally closed position. To open the second valve 73, the internal spring 70 is compressed allowing the ball 74 to be displaced from the second valve seat 78. In this way, the second valve closes and opens the opening 79 and the first valve 65 opens and closes the opening 69 which is concentric with opening 79.

The component parts of the valve assembly and the details of their assembly are more fully described in U.S. Pat. No. 4,181,143 issued to the common assignee of the present invention.

Figure 9:
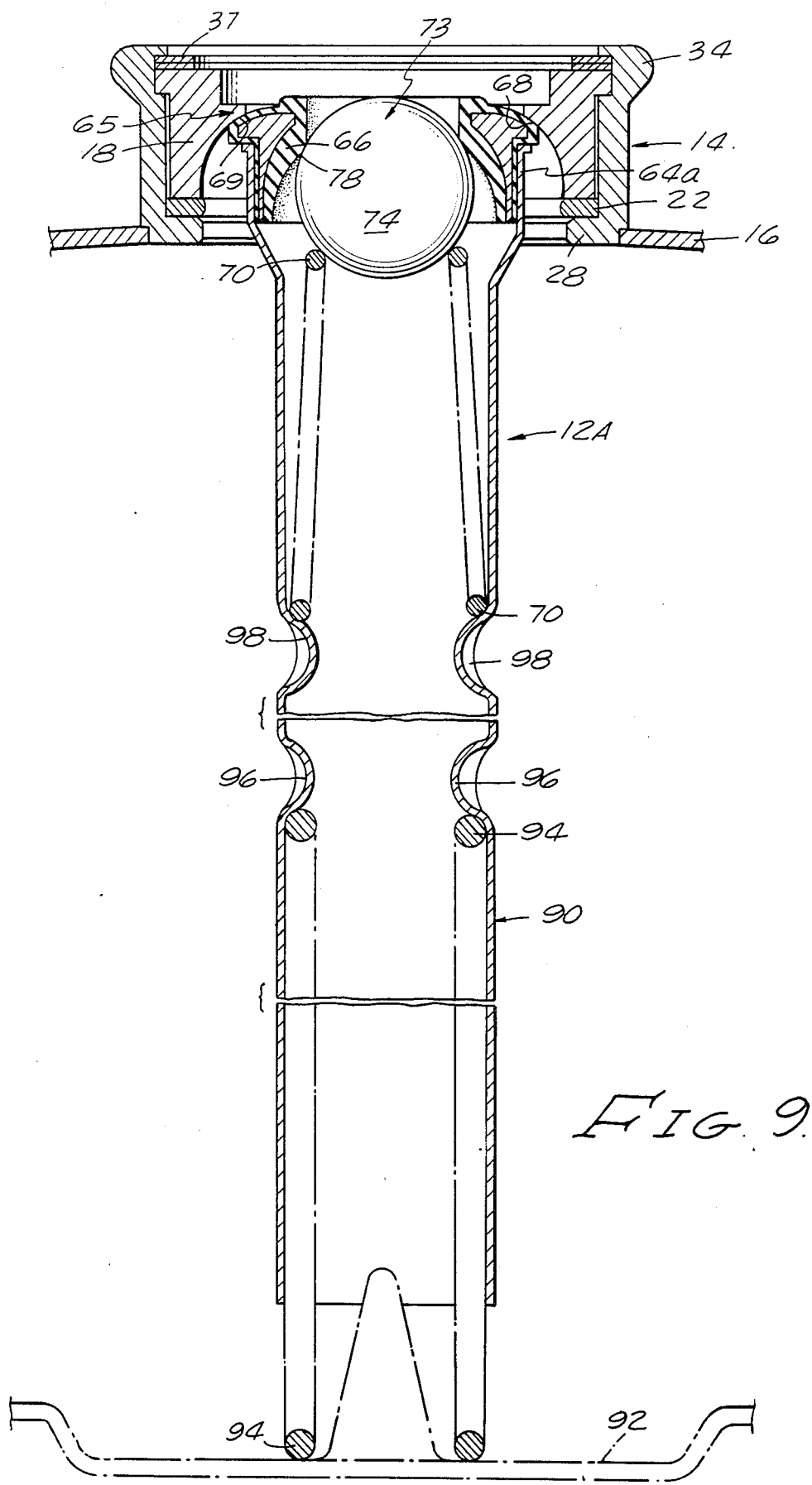
FIG. 9 is a view similar to FIG. 1 but showing a cross-sectional view of an alternate form of valve assembly of the invention secured within a neck extending from the top portion of a container.

Referring now to FIG. 9, there is shown an alternate form of valve assembly generally designated by the numeral 12A. This form of the invention is similar to that shown in FIG. 1 and like numerals are used in FIG. 9 to identify like components.

The primary differences between the devices shown in FIGS. 1 and 9 reside in the construction of the siphon tube and the absence of the spring retainer cup 58. In the embodiment of the invention shown in FIG. 9, the siphon tube, there identified by the numeral 90, extends in close proximity to the bottom of the keg shown in phantom lines and identified as 92. First valve member 66 is carried by the top portion 64a of the top of siphon tube 90 and is normally held in engagement with first valve 65 by a helical spring 94, one end of which engages the bottom of the keg 92 and the other end of which engages three circumferentially equidistant bulges 96 formed by impressing dimples on the exterior of the siphon tube 90. Helical spring 94 in its normal position maintains the engagement between the valve member 66 and the valve seat 68 until the spring is compressed to allow displacement of the valve member 66 away from the valve seat 68 thereby opening the first valve 65.

Tube 90 is provided with a second set of bulges 98 located higher up on the tube. These bulges support helical spring 70 in the manner previously described to normally maintain second valve 73 in a closed position.

The coupler assembly 20 cooperates with valve assemblies 12 and 12a to open and close the valves 65 and 73. More particularly the coupler assembly cooperates with the valve assemblies to open the passageways along the exterior portion and through the interior portion of the siphon tube by moving valve members 66 and 74 away from the respective valve seat 68 and 78.

Referring now to FIGS. 4 through 8, coupler assembly 20 has a coupler body 100 which is in the shape of a hollow cylinder and includes a depending skirt portion 102 adapted to closely fit over the upper rim portion 34 of neck 14. As best seen in FIGS. 5 and 7, skirt portion 102 is provided with three circumferentially spaced apart apertures 104. These apertures, which are preferably equally spaced apart by 120 degrees, extend completely through the walls of the skirt portion 102 and include inwardly tapering walls 106. The purpose of apertures 104 will presently be described.

Coupler assembly 20 includes a side fitting 108 through which gas is forced under pressure into the keg through the passageway formed when the first valve 65 is in the open position. Also forming a part of the assembly is a probe 112 which is reciprocally movable within a bore 110 formed axially of probe 112. In a manner presently to be described, probe 112 is movable within bore 110 between an open and closed position to actuate the valves 65 and 73. Probe 112 comprises a shaft 114 carrying a lower piston 116. Piston 116 has fixed in its periphery a sealing ring 118 to seal the interface between the piston and the inner walls of the bore 110. The portion of the shaft 114 extending upwardly above the top of the coupler body 100 carries a top fitting 120 which provides a means for coupling with tubing or other conduits for delivering the fluid which is forced out of the keg when the coupler assembly 20 is in the valve opening position. For this purpose shaft 114 is provided with a fluid passageway 122 along its longitudinal axis from one end of the shaft to the other.

As best seen in FIG. 4, lower piston 116, when moved to the valve opening position, extends beyond the bottom of the coupler body to provide an annular opening 124 therethrough. Thus, in the open position, an annular passage is formed through the bottom of the coupler body, along the space between the shaft 114 to the side fitting for the gas used in pressurizing the keg.

The bottom of the lower piston 116 has a first valve member 66 engaging surface 126 surrounding the axial fluid passageway 122. On either side of the opening 122 two fork members 128 extend downwardly from lower portion 116. These fork members are dimensioned to pass through the second valve opening 79 and engage ball 74. Similarly, piston 116 is dimensioned to pass through the first valve opening 69 so that surface 126 can engage in sealing relationship the first valve member 66 to open the valve in the manner shown in FIG. 4.

When the above configuration, when coupler assembly is engaged with the valve body the probe can be moved from a closed or retracted position where the valves remain closed, to an open or extended position where the valves are opened allowing the flow of fluids in and out of the keg through the various passages in the coupler assembly. In the open or extended position as shown in FIG. 4, the fork member 128 engages ball 74 displacing it from second valve seat 78 thereby opening the second valve and allowing fluid under pressure to pass through the siphon tube 19 around ball 74, out of second valve opening to the top fitting 120. Similarly, in the extended position, the first valve member engaging surface 126 provided on the lower piston engages the first valve member 66 displacing it downwardly away from the first valve seat 68 to open the first valve 65. In this open position the gas used to pressurize the keg is allowed to flow in the side fitting 108 through the passageway 109, through the annular space between the shaft and the inner walls of bore 110 and through the first valve opening 69 into the keg.

During the downstroke of the probe, the fork member 128 will engage the ball 74 prior to the engagement of the lower piston with the first valve member 66. As a consequence the second valve 73 will be opened slightly before the first valve 65. Upon reaching its full extension the first valve member engaging surface of the lower piston in addition to opening the first valve 65, seals the interface between the piston and the valve member 66 thereby preventing leakage between the gas and fluid flow paths. To close the valves 65 and 73 the probe is retracted to the closed position causing lower piston 116 to disengage the valve members 66 and 74 allowing them to revert to their normally closed position.

Movement of the probe downwardly is achieved by operation of a lever assembly 130. As best seen in FIGS. 4 and 6, lever assembly 130 has two arms 134 spaced from each other, each having one end connected by a pivot pin 136 to a protuberance 132 which extends from the top of the coupler body. The other end of arms 134 carries a cross-bar 138 from which extends a handle 140 for use by the operator in moving the lever from an open position to a closed position. Approximately midway between the cross-bar 138 and the pivot pin 136 are two actuator pins 142, one on each arm 134, extending inwardly for engaging recesses 144 formed proximate the top portion of the fitting 120. With this configuration, movement of the handle downwardly and pivotally about the pivot pin will result in a corresponding movement of the actuator pins which engage the probe in recesses 144 to force it downwardly.

The handle 140 further includes a locking rod 150 which is movable within a hollow portion 141 formed in handle 140 against a compression spring 152 for locking and unlocking the handle in the open and closed position (FIGS. 4 and 5). For this purpose, a member 154 having a transverse bore 156 extends from the top of the coupler body 100 into the path of movement of the locking rod. In the normal position, the compression spring maintains the locking rod in an extended position where it will engage the top of member 154. To move the handle past member 154, the handle is simply pulled outwardly away from the cross-bar 138 overcoming the effect of the compression spring 152. This will retract the locking rod 150 sufficiently so that it can be moved past the member 154. Once the lever assembly has been moved downwardly a sufficient distance, the handle can be released and the locking rod 150 will revert to its extended position and will protrude into bore 156 (FIG. 4). This position corresponds to the valve opening position which is maintained until the operator disengages the locking rod from member 154 (FIG. 5).

A highly important aspect of the present invention is the unique securement means for releasably securing the coupler assembly to the valve receiving member which, in turn, is secured to the fluid container, or keg. In the previously mentioned prior art patents to Fallon, including U.S. Pat. No. 4,181,143, a wedge surface, which circumscribed the bottom portion of the coupler assembly, mated with lugs provided on the valve body to secure the coupler assembly to the valve assembly. The securement means of the present invention improves upon this arrangement by providing a positive means for interconnecting the coupler assembly directly with the valve assembly receiving member, or keg neck 14, which is securely affixed to the keg.

Referring particularly to FIGS. 5, 7 and 8, one form of the securement means of this embodiment of the invention comprises three locking members, provided here in the form of spherical members 160, which are movable within the previously identified apertures 104 formed in the downwardly depending skirt portion 102 of the coupler body 100. Also comprising a part of the securement means of this embodiment are operating means for selectively moving the locking members from a first position, wherein the members are spaced apart from neck 14, into a second position wherein the members are in pressural engagement with the neck 14 at a location immediately below rim 34. In the embodiment of the invention shown in the drawings, the operating means comprises a manually operably means, or ring shaped member 162 which circumscribes skirt 102 and is rotatably carried by the coupler body 100. Ring shaped member 162 is provided with three indentations defining cam-like surfaces 164, which are adapted to rollably engage the locking members, or spheres, 160. As best seen by referring to FIGS. 7 and 8, when ring member 162 is in a first position, the spherical members 160 are disposed in a radially outward position with respect to the apertures 104. However, when the ring 162 is rotated relative to the coupler body to the position shown in FIG. 8, the cam surfaces 164 cause the locking spheres 160 to move inwardly within apertures 104 into secure pressural engagement with the neck portion 14 at a location immediately below the upper rim 34 formed proximate the top of the neck 114. As shown in FIG. 4, with the securement means in this locking position, the coupler cannot be lifted relative to the neck 114, although it may be rotated about the neck so long as the lever assembly 130 is in the first upper position shown in FIG. 5. To guide this rotational movement and to sealable interconnect member 162 and skirt 102 there is provided an elastomeric O-ring 103 carried within a circumferential groove 105 formed in skirt 102. However, upon rotation of ring 160 to the position shown in FIG. 7, wherein the locking spheres 160 are retracted, the coupler assembly may be freely lifted and separated from the neck 14 in the manner shown in FIG. 5.

Another very important feature of the present invention relates to the provision of a novel safety locking means which is carried by the coupler body for cooperation with the probe actuating means for locking the ring, or manually operable member, 162 in its second locking position upon actuation of the actuating means to move the probe to its second valve opening position as shown in FIG. 4. The construction and operation of the safety locking means of this embodiment will now be described.

Referring particularly to FIGS. 4 and 7, the ring shaped, or manually operable member 162 can be seen to be provided with a radially inwardly extending planar shaped locking tab 168 which tab is provided with an aperture 169 therethrough (FIG. 7). Tab 168 is adapted to be closely received within a radially inwardly extending slot 172 formed in coupler body 100 intermediate the top surface thereof 170 and the bottom surface thereof 173. Slot 172 extends circumferentially of body portion 100 a sufficient distance to permit tab 168 to travel therewithin the distance necessary to accommodate rotation of ring 162 from the position shown in FIG. 7 to the position shown in FIG. 8.

Also forming a part of the safety locking means of the present invention is a plunger pin locking assembly which is carried within a bore 176 formed in coupler body 100 (FIG. 4). Bore 176 extends from the top surface 170 of the coupler body to the radially inwardly extending slot 172. The plunger pin locking assembly comprises a locking pin 178 having a diametrically enlarged portion 180 adapted to engage a biasing means, shown here as a spring 182, adapted to yieldably resist movement of the locking pin downwardly toward slot 172. As shown in FIG. 5, locking pin 178 has a first end 178a which normally extends above the top surface 170 of the coupler body, and a second end 178b which is adapted to be closely received within aperture 169 formed in locking tab 168. As can best be seen by referring to both FIGS. 7 and 8, when the ring member 162 is in the first position shown in FIG. 7, the aperture 169 is out of alignment with the pin 178. However, when the ring is rotated into its locking position as shown in FIG. 8, aperture 169 indexes with locking pin 178, so that upon movement of the locking pin downwardly into the coupler body 100, the second end 178b of the locking pin will be lockably received within aperture 169. In this position, ring 162 cannot be rotated relative to body 100 and, accordingly, the coupler cannot be separated from the neck 14. Since this condition is highly desirable when the valves of the valve assembly are in their open position, the safety locking means of the invention is actuated by the lever assembly 130. More specifically, when the lever assembly is moved downwardly into the valve opening position shown in FIG. 4, the cross-member 138 of the lever assembly will engage the top 178a of the locking pin and will move the pin downwardly against the urging of spring 182 into the aperture 169 provided in tab 168. So long as the lever assembly is thus locked in its downward position, as shown in FIG. 4, the locking pin will remain in place within aperture 169 to block rotation of ring 162 relative to coupler body 100. This in turn, of course, prevents separation of the coupler assembly from the neck 14 so long as the valves are in an open position and fluid is being drawn from the keg. However, when the lever assembly is moved into the position shown in FIG. 5 and the valves 65 and 73 are closed, spring 182 will urge locking pin 178 upwardly permitting rotation of ring 162 and the removal of the coupler assembly.

Figure 10:
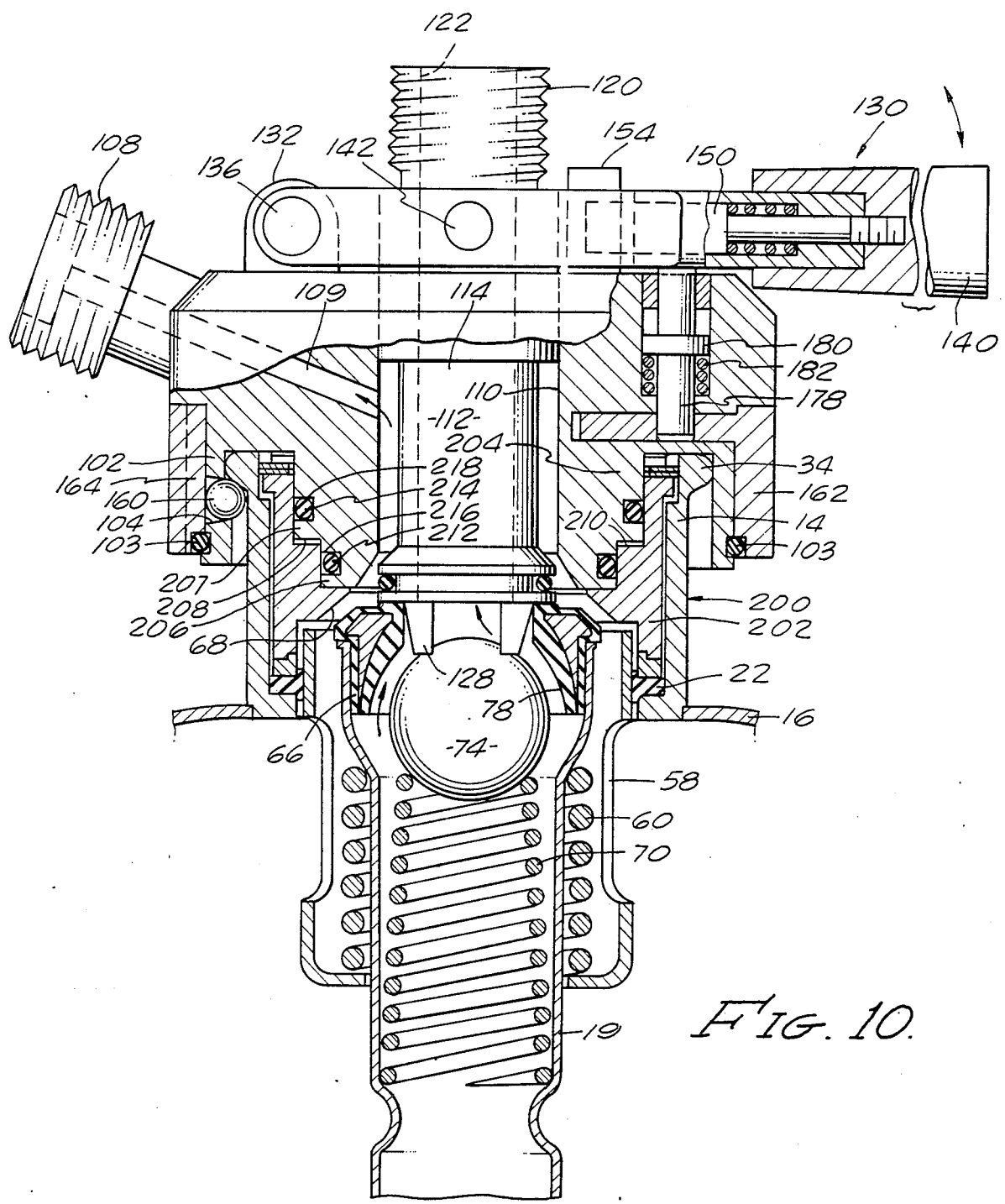
FIG. 10 is a view similar to FIG. 4 showing an alternative form of coupler assembly and valve assembly embodying a dual o-ring sealing arrangement for sealing the coupler to the valve assembly receiving member.

Turning now to FIG. 10 another form of the coupler and valve assembly of the invention is there shown. In this form of the invention the neck or valve assembly receiving member, is of greater height than that shown in FIG. 1 and the body of the coupler is correspondingly elongated to enable the use of a dual o-ring sealing arrangement to seal the coupler assembly relative to the valving mechanism. In light of the fact that most of the component parts of the valve assembly and of the coupler are identical to those previously described, like numbers have been used in FIG. 10 to identify like components, which components will not be further described in detail at this point.

Comparing FIG. 10 with FIGS. 1 and 4 it can be seen that neck or valve assembly receiving member 200 of FIG. 10 is of greater height as is first valve member 202 (18 in FIG. 1). Correspondingly, the coupler body 204 (100 in FIG. 4) is of greater height. Additionally, coupler body 204 includes a reduced diameter lower portion 206 which defines a step 208 at its junction with a upper portion 207. In this form of the invention, the first valve member 202 is also stepped at 210.

To provide a redundant seal of the coupler body 204 with the valve member 202, dual o-rings 212 and 214 are carried within circumferential grooves 216 and 218 formed respectively in coupler body portions 206 and 207.

The valve assemblies and the securement means of this form of the invention are as previously described. The securement means comprises three locking members, provided in the form of spherical members 160, which are movable within apertures 104 formed in the downwardly depending skirt portion 102 of coupler body 204. Also comprising a part of the securement means of this embodiment are operating means for selectively moving the locking members from a first position, wherein the members are spaced apart from neck 14, into a second position wherein the members are in pressural engagement with the neck 14 at a location immediately below rim 34. The operating means of this embodiment of the invention is also the same as previously described and comprises a manually operably means, or ring shaped member 162 which circumscribes skirt 102 and is rotatably carried by the coupler body 204. Ring shaped member 162 is provided with three indentations defining cam-like surfaces 164, which are adapted to rollably engage the locking members, or spheres, 160. When ring member 162 is in a first position, the spherical members 160 are disposed in a radially outward position with respect to the apertures 104.

However, when the ring 162 is rotated relative to the coupler body to the position shown in FIG. 10, the cam surfaces 164 cause the locking spheres 160 to move inwardly within apertures 104 into secure pressural engagement with the neck portion 14 at a location immediately below the upper rim 34 formed proximate the top of the neck 14. With the securement means in this locking position, the coupler cannot be lifted relative to the neck 14, although it may be rotated about the neck so long as the lever assembly 130 is in the first upper position wherein the valves are closed.

When the coupler is moved into the second position and the valves are opened by downward movement of the lever assembly in the manner shown in FIG. 10, the dual O-rings 212 and 214 effectively prevent leakage between the coupler body and the elongated first valve member 202.

The embodiment of the invention shown in FIG. 10 also includes the novel safety locking means of the character previously described. As in the earlier described embodiments, the safety locking means is carried by the coupler body for cooperation with the probe actuating means for locking the ring, or manually operable member 162 in its second locking position upon movement of the probe to its second valve opening position as shown in FIG. 4. The construction and operation of this safety locking means is as previously described herein.

Figure 11:
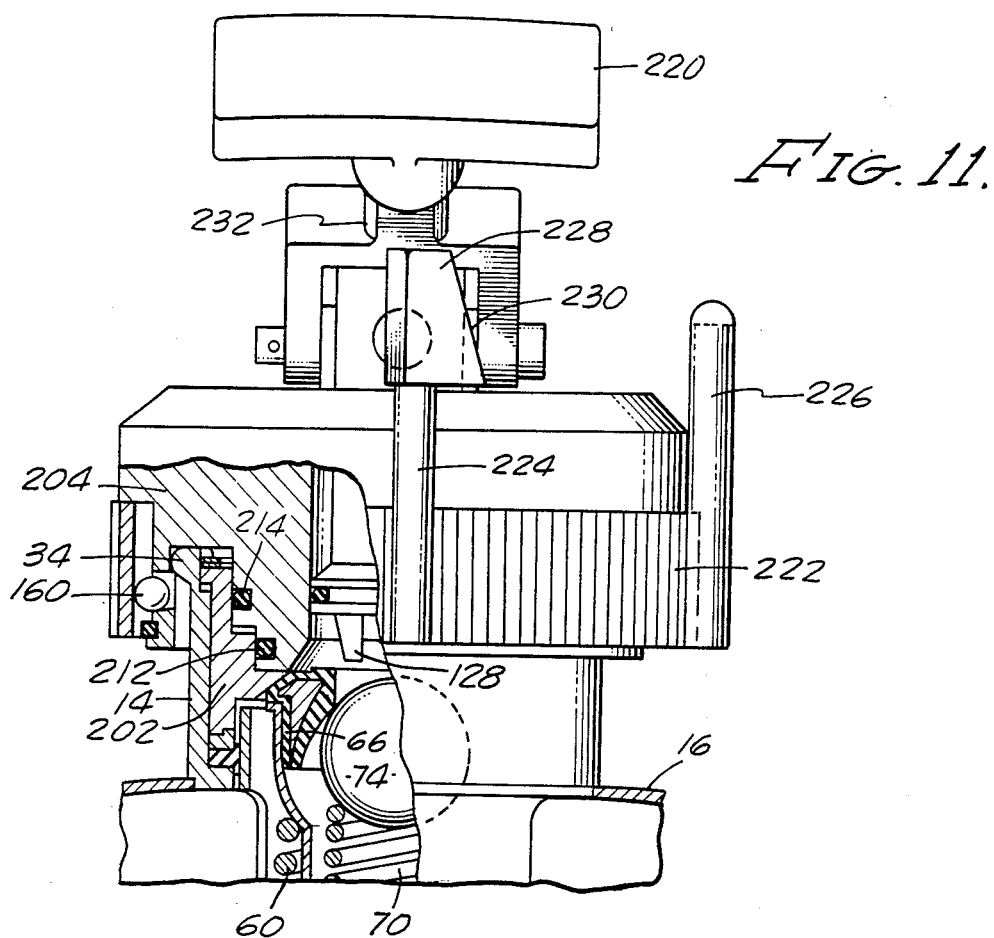
FIG. 11 is a side elevational view partly in section similar to FIG. 10 showing another alternate form of coupler assembly having a different type of safety locking mechanism. The coupler is shown in FIG. 10 with the valves in a closed position and with the securing means in a retracted configuration.
Figure 12:
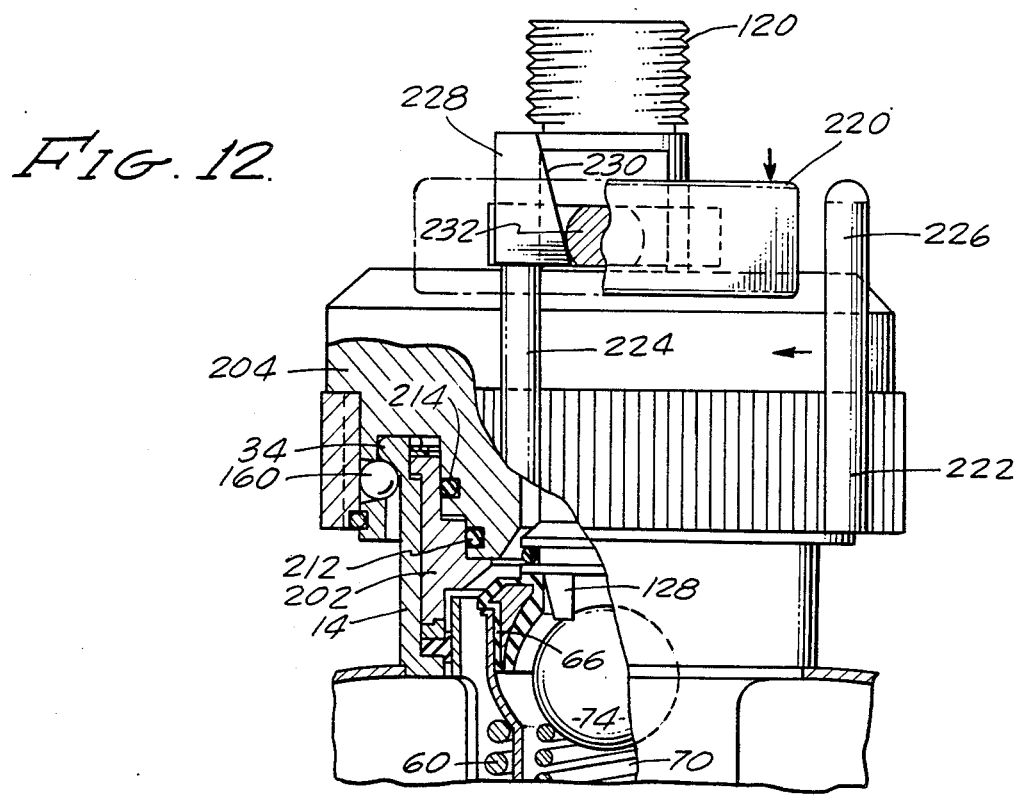
FIG. 12 is a view similar to FIG. 11, but showing the valves in an open position and the coupler having been rotated to move the securement means into an engaged position.

Referring now to FIGS. 11 and 12, still another form of the coupler and valve assembly of the invention is thereshown. In this last to be described form of the invention the neck, or valve assembly receiving member, is of greater height than that shown in FIG. 1 and the body of the coupler is correspondingly elongated as in the embodiment shown in FIG. 10. Accordingly, the dual O-ring sealing arrangement can be used to seal the coupler assembly relative to the valving mechanism.

The primary difference between this latter form of the invention and that shown in FIG. 10 resides in the different, and somewhat simplified, safety locking means which prevents removal of the coupler from the valving mechanism when the valves are in an open position.

Once again, save for the design of the safety locking means, the components of the coupler assembly and of the valving mechanism are identical to those previously described. Accordingly, like numerals will be used in FIGS. 11 and 12 to identify like components as previously described in connection with FIGS. 1 through 10.

Referring particularly to FIG. 11, the dual O-ring coupler body 204 is shown mounted on the valving mechanism, but the locking spheres 60 of the securement means are shown in their retracted position. Also, the lever assembly, which includes a gripping handle 220 of slightly different design, is raised in the valved closed position.

The securement means is operated by rotation of ring shaped member 222, which is of similar design to ring member 162, and functions to cam the locking spheres 160 into the inward, secured position shown in FIG. 12. To assist in the rotation of member 222 and also to serve as a safety locking mechanism ring 222 is provided with two circumferentially spaced, upstanding columns 224 and 226. Column 224 includes an upper head portion 228 having a sloping face 230 the purpose of which will presently be described. By gripping columns 224 and 226 with the fingers of one or both hands, the ring 222 can be easily rotated to cam spheres 160 securely against neck portion 14 at locations immediately below rim 34.

After ring 222 has been rotated in the direction of the arrows from the position shown in FIG. 11 to the position shown in FIG. 12 to operate the securement means, the valves of the valving mechanism can be opened by moving the lever assembly from the raised position shown in FIG. 11 to the lowered position shown in FIG. 12. The lever assembly of this embodiment operates in the same manner as described in the discussion of the embodiments shown in FIGS. 1 through 10. However, the handle part 220 comprises a transversely extending, rather than axially extending gripping member for gripping by the operator. As indcted to FIG. 11, this handle portion is affixed proximate the outer end of the lever assembly so that in the lowered position shown in FIG. 12 it extends radially outwardly beyond, and is located between, columns 224 and 226. More particularly, in the closed position the shank portion 232 (FIG. 12) of the lever assembly, which is located radially inwardly from handle 220, is disposed in close proximity with the sloping face 230 of head 228 of column 224. In this position ring 222 is locked against rotation in a direction to accomplish retraction of spheres 160 of the securement means. In this way, so long as the lever assembly is in the downwardly extending, valve opening position shown in FIG. 12, the ring 222 cannot be rotated to operate the securement means. Accordingly, the coupler cannot be removed from the valving mechanism.

Because columns 224 and 226 function to provide the safety locking feature of this latter described form of the invention, the previously identified locking tab 168 and locking pin 178 arrangement of FIGS. 1 through 10 can be eliminated from the coupler of the embodiment of the invention shown in FIGS. 11 and 12.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A coupler assembly for use with a valve sealing arrangement for sealing a container of fluid of the type having a valve assembly for providing access to the container and a valve assembly receiving member secured to the container, said valve assembly having first and second valves therein adapted to be operated by said coupler assembly to move said valves between an open and a closed position, said coupler assembly comprising:
   (a) a coupler body having a side fitting extending therefrom connected to a first passage within said coupler body and further including a depending skirt portion receivable over said valve assembly receiving member and having at least one aperture extending therethrough;
   (b) a probe member movable within said coupler body having a fitting connected to one end of said probe member, said probe member defining a passageway therethrough in communication with said fitting;
   (c) said probe member being movable within said coupler body between an open and a closed position whereby in said open position said coupler body actuates said valves of said valve assembly to connect said passages in said coupler assembly to said open valves and in said closed position said passages are sealed from said valves of said valve assembly;

(d) actuating means for moving said probe between said first and second position, said actuating means comprising a lever assembly and a handle member connected to said lever assembly providing means for moving said lever assembly from an open position to a closed position, said lever assembly being pivotally secured to said coupler body for movement about a pivot axis, said lever assembly having engaging means for engaging said probe member, whereby pivoting of said lever assembly about said pivot axis moves said probe between said open position and said closed position, said lever assembly further comprising two lever arms spaced from each other and extending parallel from said pivot axis, said coupler body defining a pivot flange extending from one side thereof, each of said lever arms having one end pivotally secured to one side of said pivot flange by a pivot pin, the other end of said lever arms being connected to each other by a cross-member, said handle extending outwardly from said cross-member for grasping by an operator;

(e) retaining means for holding said probe in said open and said closed positions; and (f) securement means for releasably securing said coupler assembly to said valve assembly receiving member including at least one locking member movable within said aperture formed in said skirt portion from a first position spaced apart from said valve assembly receiving member to a second position in pressural engagement with said valve assembly, and operating means for selectively moving said locking member from said first position to said second position, said operating means comprising a ring shaped member rotatably carried by said coupler body, said ring shaped member having a cam surface adapted to engage said locking member to move said locking member from said first to said second position upon rotation of said ring shaped member relative to said coupler body from a first position to a second position, said ring shaped member including an inwardly extending locking tab having an aperture therethrough, said coupler body including a top surface and a bottom surface, a radially inwardly extending slot formed intermediate said top and bottom surfaces for closely receiving said locking tab of said ring member, and a pin receiving bore extending from said top surface to said slot.

2. A coupler assembly as defined in claim 1 including a plunger pin locking assembly carried within said bore formed in said coupler body, said locking assembly comprising:

(a) a locking pin having a first end normally extending above said top surface of said coupler body and a second end disposed proximate said slot formed in said coupler body; and (b) biasing means for yieldably resisting movement of said locking pin toward said slot.

3. A coupler assembly as defined in claim 2 in which said aperture in said locking tab of said ring shaped member is adapted to index with said pin receiving bore formed in said coupler body when said ring shaped member is moved from said first position to said second position.

4. A coupler assembly as defined in claim 3 in which said locking pin is adapted to be engaged by said lever assembly of said coupler assembly and moved downwardly toward said slot against the urging of said biasing means upon pivoting of said lever assembly to move said probe to said open position, whereby when said ring shaped member is in said second position said locking pin will extend through said aperture in said locking tab to prevent rotation of said ring shaped member relative to said coupler body.

5. A coupler assembly for use with a valve sealing arrangement for sealing a container of fluid of the type having a valve assembly for providing access to the container and a non-threaded valve assembly receiving member secured to the container, said valve assembly having at least one valve therein adapted to be operated by said coupler assembly when said assembly is connected to said valve receiving assembly to move said valve between an open and a closed position, said coupler assembly comprising:

(a) a coupler body having a depending skirt portion receivable over said valve assembly receiving member, said skirt portion having at least one aperture extending therethrough;

(b) a probe member adapted to cooperate with said valve of said valve assembly when said coupler assembly is connected to said valve receiving assembly, said probe member being movable within said coupler body between a first position wherein said valve is closed to a second position wherein said valve is open; and (c) actuating means carried by said coupler body for moving said probe between said first and second position;

(d) safety locking means carried by said coupler body for cooperation with said actuating means for preventing disengagement of said coupler body from said valve assembly receiving member so long as said probe is in said second position; and (e) securement means for releasably securing said coupler assembly to said valve assembly receiving member including at least one locking member movable within said aperture formed in said skirt portion from a first position spaced apart from said valve assembly receiving member to a second position in pressural engagement with said valve assembly receiving member; and operating means for selectively moving said locking member from said first to said second position, said operating means comprising a ring shaped member circumscribing said coupler body, said ring shaped member including a radially inwardly extending locking tab adapted to cooperate with said safety locking means to lock said ring shaped member against rotation when said actuating means is actuated to move said probe to said second position, whereby said coupler assembly cannot be disengaged from said valve assembly receiving member so long as said probe is in said second position.

6. A coupler assembly for use with a valve sealing arrangement for sealing a container of fluid of the type having a valve assembly for providing access to the container and a valve assembly receiving member secured to the container, said valve assembly having first and second valves therein adapted to be operated by said coupler assembly to move said valves between an open and a closed position, said coupler assembly comprising:
  (a) a coupler body having a side fitting extending therefrom connected to a first passage within said coupler body and further including a depending skirt portion receivable over said valve assembly receiving member and having at least one aperture extending therethrough;
  (b) a probe member movable within said coupler body having a fitting connected to one end of said probe member, said probe member defining a passageway therethrough in communication with said fitting;
  (c) actuating means for moving said probe member within said coupler body between an open and a closed position whereby in said open position said coupler body actuates said valves of said valve assembly to connect said passages in said coupler assembly to said open valves and in said closed position said passages are sealed from said valves of said valve assembly; and
  (d) safety locking means carried by said coupler body for cooperation with said actuating means for preventing disengagement of said coupler body from said valve assembly receiving member so long as said probe is in said second position; and
  (e) securement means for releasably securing said coupler assembly to said valve assembly receiving member including at least one locking member movable within said aperture formed is said skirt portion from a first position spaced apart from said valve assembly receiving member to a second position in pressural engagement with said valve assembly, and operating means for selectively moving said locking member from said first position to said second position, said operating means comprising a ring shaped member rotatably carried by said coupler body, said ring shaped member having a cam surface adapted to engage said locking member to move said locking member from said first to said second position upon rotation of said ring shaped member relative to said coupler body from a first position to a second position, said ring shaped member further including means for cooperating with said safety locking means to lock said ring shaped member against rotation when said actuating means is actuated to move said probe to said second position, whereby said coupler assembly cannot be disengaged from said valve assembly receiving member so long as said probe is in said second position.

7. A coupler assembly for use with a valve sealing arrangement for sealing a container of fluid of the type having a valve assembly for providing access to the container and a non-threaded valve assembly receiving member secured to the container, said valve assembly having at least one valve therein adapted to be operated by said coupler assembly when said assembly is connected to said valve receiving assembly to move said valve between an open and a closed position, said coupler assembly comprising:
  (a) a coupler body having a depending skirt portion non-rotatably receivable over said valve assembly receiving member said skirt portion having three circumferentially spaced apertures extending therethrough;
  (b) a probe member adapted to cooperate with said valve of said valve assembly when said coupler assembly is connected to said valve receiving assembly, said probe member being movable within said coupler body between a first position wherein said valve is closed to a second position wherein said valve is open;
  (c) actuating means carried by said coupler body for moving said probe between said first and second position;
  (d) securement means for releasably securing said coupler assembly to said valve assembly receiving member including three locking members movable within said apertures formed in said skirt portion from a first position spaced apart from said valve assembly receiving member to a second position in pressural engagement with said valve assembly receiving member; and operating means for selectively moving said locking members from said first to said second position, said operating means comprising a manually operable ring shaped member circumscribing and carried by said coupler body for movement relative thereto, said member having three locking member engagement surfaces disposed proximate said locking members for engagement with said three locking member to move said members from said first position to said second position upon movement of said ring shaped member relative to said coupler body from a first position to a second position; and
  (e) safety locking means carried by said coupler body for cooperation with said actuating means for locking said manually operable member in said second position upon actuation of said actuating means to move said probe to said second position, said ring shaped member of said operating means including a radially inwardly extending locking tab adapted to cooperate with said safety locking means to lock said ring shaped member against rotation when said actuating means is actuated to move said probe to said second position, whereby said coupler assembly cannot be disengaged from said valve assembly receiving member so long as said probe is in said second position.

* * * * *